Aug. 6, 1957   J. S. MEDOWAR   2,801,856
REMOVABLE GAME BOARD APPARATUS
Filed Oct. 24, 1956   2 Sheets-Sheet 1

INVENTOR.
JEROME S. MEDOWAR
BY
ATTORNEY

Aug. 6, 1957    J. S. MEDOWAR    2,801,856
REMOVABLE GAME BOARD APPARATUS
Filed Oct. 24, 1956    2 Sheets-Sheet 2
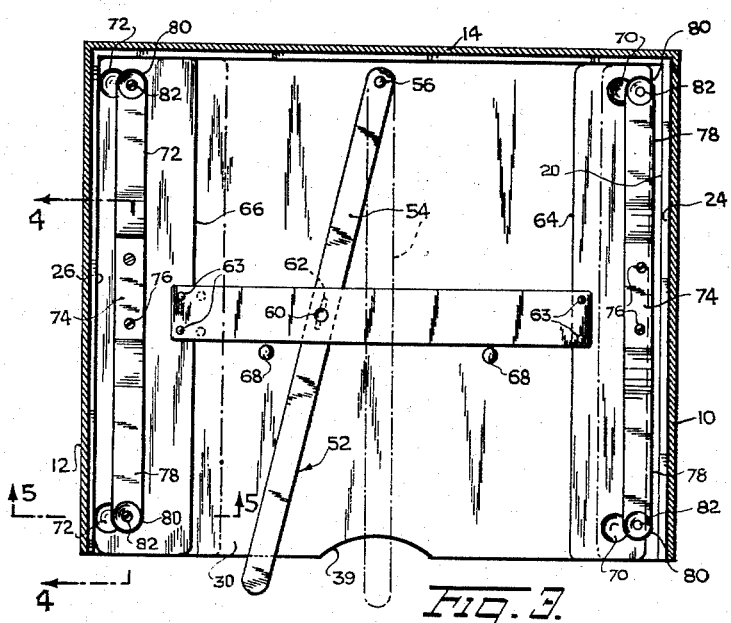
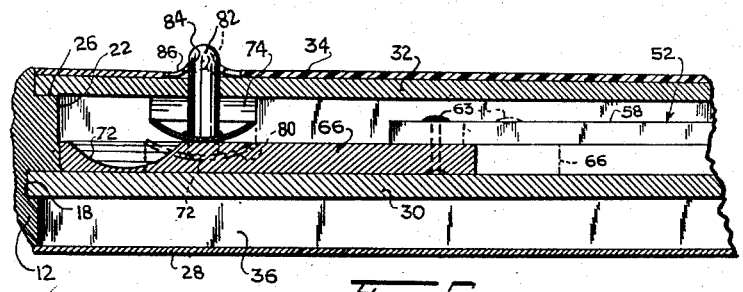
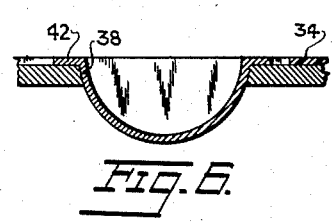
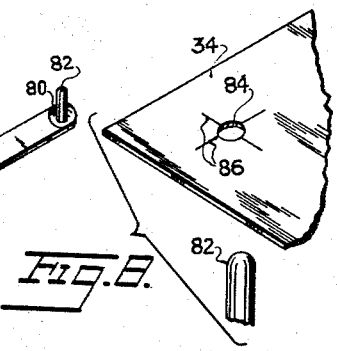
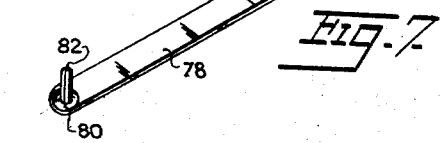
INVENTOR.
JEROME S. MEDOWAR
BY
ATTORNEY

United States Patent Office 2,801,856
Patented Aug. 6, 1957

2,801,856

REMOVABLE GAME BOARD APPARATUS

Jerome S. Medowar, Merrick, N. Y.

Application October 24, 1956, Serial No. 617,994

4 Claims. (Cl. 273—136)

This invention relates to games and, more particularly, to educational games.

Summarized briefly, the invention is a game adapted to be played by two or more children of the same general age and reading ability level, and is so designed as to provide amusement for the players while at the same time improving their ability to read. The game is so designed as to permit the selection of a playing surface, with a plurality of different sheets being provided, the words on each sheet being for children of a different reading ability level as compared to the words on the remaining sheets. Means is provided for releasably engaging the sheets, in the form of a series of pegs adapted to be retracted responsive to throw of a lever handle, thus to release a particular sheet when another sheet is to be substituted therefor.

It is well known that the ability to provide amusement for a child who is learning to read, while at the same time improving his word recognition, will hasten his progression to ever higher reading levels. An important object of the present invention is to provide a game which will have this desirable characteristic. To this end, the game is adapted to be used by children during their continued progression from one reading level to a higher level, and when so used can be supplemented by a reader containing stories including the words found in the game. This permits the child to reinforce his ability to recognize the words and also to understand their meaning in context. A corollary object, accordingly, is to provide a game which is well adapted for use as a teaching aid, so that it may be used not only in the home but also in the classroom.

A further object of importance is to facilitate the interchange of the overlays or top sheets having the playing surfaces depicted thereon, through the medium of a novelly designed peg-retracting mechanism capable of effecting the swift retraction of the overlay-gripping, rectangularly spaced pegs of the game board.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a plan sectional view on line 3—3 of Fig. 2, in which the peg-retracting means is shown in full lines in its normal position in which the pegs are elevated, and in dotted lines in the position assumed thereby when the pegs are being retracted.

Fig. 5 is a detail sectional view, still further enlarged, on line 5—5 of Fig. 3.

Fig. 6 is an enlarged, detail sectional view on line 6—6 of Fig. 1, showing the well for receiving the playing pieces.

Fig. 7 is an enlarged perspective view of one of the peg-retracting springs, per se.

Fig. 8 is a fragmentary, exploded perspective view of one of the pegs and a cover sheet or overlay.

The game board is of rectangular configuration, and includes oppositely but identically formed side walls 10, 12 connected at one end by a miter joint to opposite ends of a back wall 14.

The several walls have beveled outer surfaces, and as will be noted no front wall is provided, so that access can be had to the interior of the game board for storage or removal of the cover sheets or overlays.

Figure 2:
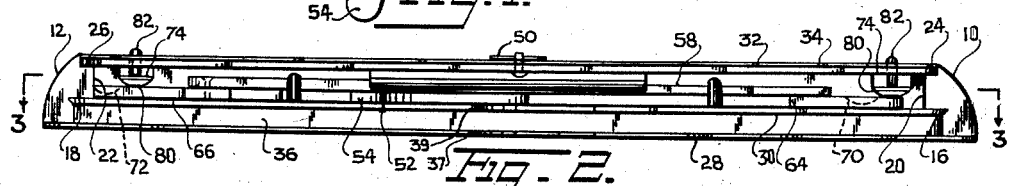
Fig. 2 is a front elevational view thereof.
Figure 4:
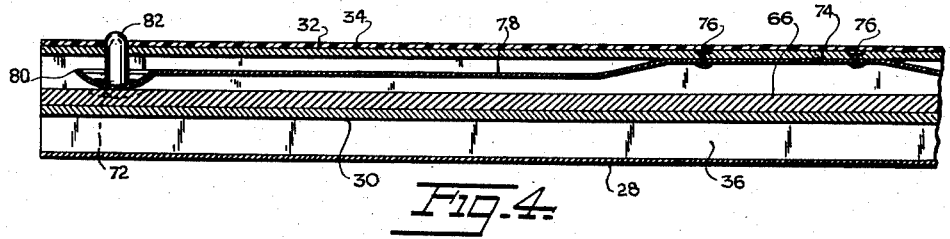
Fig. 4 is an enlarged sectional view on line 4—4 of Fig. 3.

Referring to Figs. 2 and 5, on their inner surfaces, the side walls are formed with longitudinal, confronting grooves 16, 18, respectively, above which are formed inwardly projecting, longitudinal ribs 20, 22 respectively defining upwardly facing shoulders 24, 26, respectively. The back wall is similarly formed, and secured at its sides and back to the bottom surfaces of the side and back walls is a bottom plate 28. Engaged at its sides and back in the grooves of the side and back walls is a horizontal partition or support plate 30, spaced above the bottom plate to provide a space therebetween designated at 36, in which a set of cover sheets can be stored.

Secured at its sides and back to the ribs of the several walls and supported upon the shoulders defined by said ribs is a top plate 32, adapted to provide a support for a selected cover sheet 34 of thin plastic or other durable, readily washable material.

To facilitate the insertion and removal of cover sheets, the front edges of the plates 28, 30 are formed with registering, arcuate indentations 37, 39.

Figure 1:
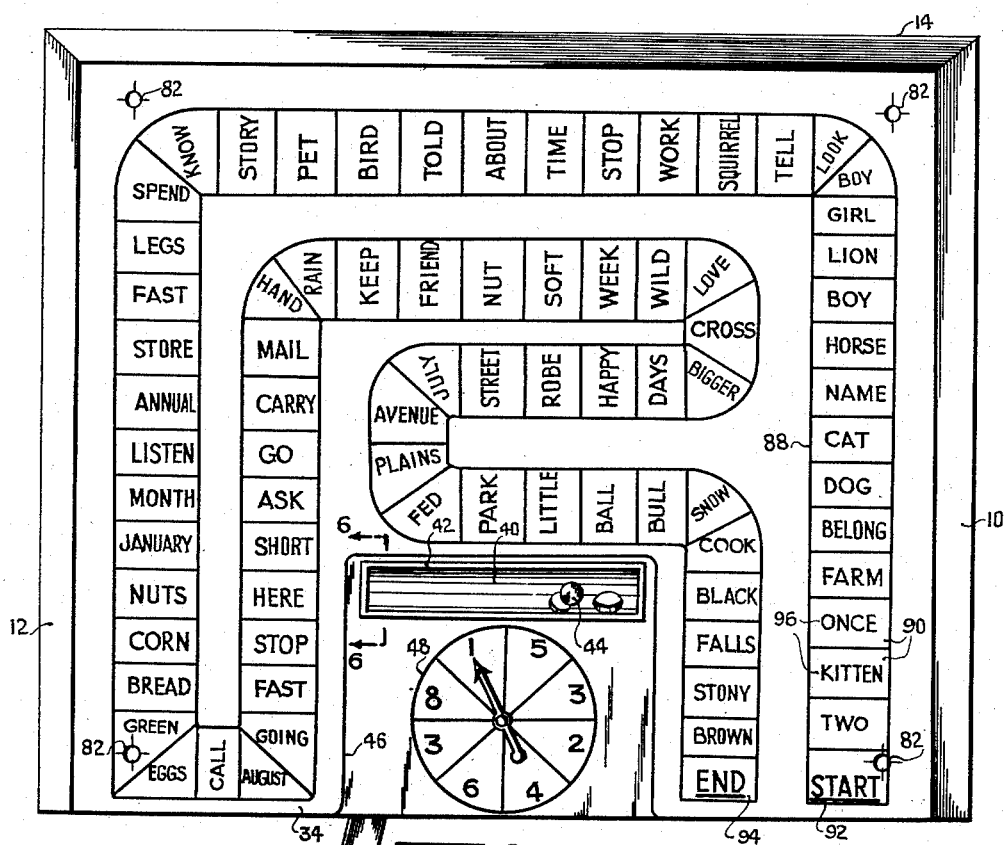
Fig. 1 is a top plan view of a game board formed according to the present invention.

Referring to Figs. 1 and 6, formed in the top plate 32, inwardly from the front edge thereof, is an elongated, rectangular opening 38 having its length extending transversely of the game board. An upwardly opening, semi-cylindrical well 40 is removably seated in said opening, and is formed with an outwardly directed peripheral flange 42 supported upon the edge portion of the opening. As shown in Fig. 1, each cover sheet 34 is formed with a wide, forwardly opening, rectangular recess 46 so as to leave the well exposed when a cover sheet is positioned upon the top plate 32. Playing pieces 44, which can be of any desired shape such as small discs, can be kept in the well 40 when the game is not in use.

The recess 46 further exposes a spinner disposed in front of the well, designated at 48. Spinner 48 is marked upon the top plate 32, and is marked off into eight segments in the illustrated example, numbered "1" to "8." The number of spaces in the spinner can of course vary, and the numeral indicia similarly can be varied accordingly to the desires of the particular manufacturer. Rotatable upon the surface of the spinner is an index arm 50 which, when spun, comes to rest in a position pointing to one or another of the numerical indicia.

Means is provided for releasably engaging the sheets upon the top plate 32, and has been generally designated at 52. Said means includes an elongated lever handle 54 (Fig. 3) one end of which is pivotally connected at 56 to the partition 30 medially between the opposite sides of the game board, adjacent the back wall. The other end of the lever projects through the open front of the game board, to provide a handle, with the lever being swingable about a vertical axis between the wall and dotted line positions of Fig. 3.

Overlying the midlength portion of lever 54 is an elongated, transversely extending connecting bar 58, having an opening receiving a pin 60 that also extends through a short longitudinal slot 62 of the lever, so that on swinging of the lever in a selected direction the connecting bar will be shifted transversely of the game board in the same direction.

At its opposite ends, bar 58 is fixedly connected to elongated, flat side plates by means of screws or equivalent fastening elements 63. The side plates have been designated at 64, 66 respectively, with the connecting bar being connected to the intermediate portions of the side plates. The side plates, like the handle 54, are adapted to slide upon the partition 30, and as shown in Fig. 3, the side plates at one end are in slidable contact with and are guided by the back wall 14.

Cooperating with the back wall in insuring straight line movement of the bar 58 and plates 64, 66 in opposite directions are upstanding pins 68 fixedly secured to plate 30 at opposite sides of the rod 52 in longitudinal contact with that longitudinal edge of connecting bar 58 nearer the front of the bar.

It will thus be seen that assuming that the handle is in the full line position of Fig. 3, the side plates 64, 66 will be shifted correspondingly, to their maximum extent, to the left in Fig. 3. Movement of the plate in this direction is limited by engagement of plate 66 against side wall 12. On swinging of the handle in the opposite direction to its dotted line position, there will be straight line movement of the plates 64, 66 in a direction transversely of their lengths, until plate 64 engages against side wall 10.

Formed in the upper surface of plate 64 adjacent opposite ends thereof are shallow, circular depressions 70, aligned longitudinally of plate 64, that is, said depressions are aligned with one another along a line normal to the path of movement of side plates 64, 66. Side plate 66 is provided with a similar pair of depressions 72.

Extending along opposite sides of the game board, inwardly a short distance from and parallel to the side walls, are elongated leaf springs 74. The springs, as shown in Fig. 7, have upwardly offset midlength portions formed with longitudinally spaced apertures, and the apertures receive rivets 76 or the like whereby the raised portions are fixedly secured to the underside of top plate 32.

The end portions of the springs have been designated at 78 and are formed at their outer extremities with circular projections 80. Projections 80 are of concavo-convex formation, with their convex surfaces facing downwardly, in a line with the path of movement of the depressions 70, 72 of the respective side plates.

Fixedly secured in the shallow indentations defined in the top surfaces of the springs by projections 80 are short, upstanding pegs 82, having rounded upper ends. The pegs are slidable freely in openings formed in the top plate 32, and when not in their upper positions shown in full lines in Fig. 5 project through corner openings 84 of the cover sheet 34. Openings 84 are in communication with crossing slits 86 of the cover sheet, and are of a diameter such that when the pegs are projected upwardly through the openings of the top plate, said pegs will frictionally engage the edges of the openings 84 to securely hold the top sheet in position.

It will thus be seen that assuming that it is desired to remove a particular top sheet, one need only throw the handle 54 to its dotted line position of Fig. 3. This will register the depressions 70, 72 with projections 80, and due to the inherent tension of the end portions 78 of the spring, said end portions will be free to flex downwardly to seat projections 80 in their associated depressions. This retracts the pegs to the dotted line positions of Fig. 5, out of engagement with the cover sheet 34. The pegs will be retracted simultaneously so that the cover sheet is now free to be removed, for replacement of the same with a different cover sheet. Before the new sheet is placed upon the board, handle 54 can be swung back to its normal position, and this has the effect of camming the projections 80 upwardly as the walls of the depressions 70, 72 move out of register therewith.

Projections 80 move upwardly against the restraint of springs 78, and in the final position of the parts shown in full lines in Fig. 3, the projections 80 will bear against the top flat surfaces of the side plates to hold the pegs in their extended positions.

Referring now to Fig. 1, each cover sheet has on its top surface a tortuous path 88. The path can twist or turn in any of various arrangements desired, the particular arrangement shown in Fig. 1 being merely representative of many that can be employed.

The path 88 is marked off into blocks 90 over its full length, the block at one end of the path comprising a starting block and being designated 92 and the block at the other end comprising a finish point for the game and being designated at 94.

In each block there is printed a different word, and if desired there can be provided in each block a picture. For example, a block having the word "cat" may have a picture of a cat, etc.

In any event, all of the words on a particular cover sheet will be of the same general difficulty so far as the child's ability to read is concerned. Thus, one or more children at a particular age and reading ability level may play the game, reading words that they should, at their particular level, immediately recognize.

In playing the game, the child, by means of the spinner, is permitted to advance the playing piece a selected number of blocks. The block to which the playing piece is moved contains a word, and if the child can read the word, he holds his position and takes another turn at the spinner. He continues until he misses a word, in which instance he must return to the last word he was able to recognize plus the number of spaces he had received on the spinner.

The next child now takes his turn, and the game goes on until it is won by a player who reaches a goal first. The game can be played if desired by a single child, in which event the parent or teacher may set an arbitrary time limitation so as to hasten word recognition.

Particularly when used in a classroom, the game can be supplemented by a reader, and the teacher might, for instance, after the children have progressed through a particular portion of the reader, use a cover sheet containing new words learned in said portion for the purpose of testing and review. As the children progress through the reader to higher reading ability levels, new cover sheets are employed, containing words of correspondingly greater difficulty.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In a game, a flat, rectangular game board, a thin, flat cover sheet thereon having a playing surface, said sheet having a plurality of openings formed in the corners thereof, pegs mounted in the game board for movement into and out of the openings of the cover sheet for holding the cover sheet upon the game board when the pegs are extended through the openings, and means for retracting the pegs from the openings, the cover sheet having a plurality of radial slits communicating with the respective openings, said openings being of a diameter slightly smaller than the maximum diameter of the pegs, for frictionally engaging the edge portions of the openings with the pegs.

2. In a game, a game board, a cover sheet thereon having a playing surface, said sheet having a plurality of openings formed therein, pegs mounted in the game board for movement into and out of the openings of the cover sheet for holding the cover sheet upon the game board when the pegs are extended through the openings, means for retracting the pegs from the openings, said peg-retracting means having a connection to all of said pegs for effecting simultaneous retraction of the several pegs, the peg-retracting means comprising a handle swingably mounted upon the game board, a connecting bar pivotally connected to the handle and guided in the board for straight line movement responsive to swinging of the handle, a pair of side plates extending along opposite sides of the game board and fixedly secured to the connecting bar for movement therewith responsive to swinging of the handle in opposite directions, and spring means secured to the game board and supporting said pegs, said spring means being tensioned to normally retract the pegs, the side plates on movement in one direction having camming engagement with the spring means adapted to shift the same upwardly to extend the pegs against the restraint of the spring means.

3. In a game, a game board, a cover sheet thereon having a playing surface, said sheet having a plurality of openings formed therein, pegs mounted in the game board for movement into and out of the openings of the cover sheet for holding the cover sheet upon the game board when the pegs are extended through the openings, means for retracting the pegs from the openings, said peg-retracting means having a connection to all of said pegs for effecting simultaneous retraction of the several pegs, the peg-retracting means comprising a handle swingably mounted upon the game board, a connecting bar pivotally connected to the handle and guided in the board for straight line movement responsive to swinging of the handle, a pair of side plates extending along opposite sides of the game board and fixedly secured to the connecting bar for movement therewith responsive to swinging of the handle in opposite directions, and spring means secured to the game board and supporting said pegs, said spring means being tensioned to normally retract the pegs, the side plates on movement in one direction having camming engagement with the spring means adapted to shift the same upwardly to extend the pegs against the restraint of the spring means, the respective side plates having shallow cam recesses and the spring means having depending projections seating in said recesses on movement of the side plates to a position permitting the spring means to retract the pegs, movement of the side plates in an opposite direction being adapted to shift the recesses out of registration with the projections for biasing the projections upwardly to extend the pegs.

4. In a game, a game board, a cover sheet thereon having a playing surface, said sheet having a plurality of openings formed therein, pegs mounted in the game board for movement into and out of the openings of the cover sheet for holding the cover sheet upon the game board when the pegs are extended through the openings, means for retracting the pegs from the openings, said peg-retracting means having a connection to all of said pegs for effecting simultaneous retraction of the several pegs, the peg-retracting means comprising a handle swingably mounted upon the game board, a connecting bar pivotally connected to the handle and guided in the board for straight line movement responsive to swinging of the handle, a pair of side plates extending along opposite sides of the game board and fixedly secured to the connecting bar for movement therewith responsive to swinging of the handle in opposite directions, and spring means secured to the game board and supporting said pegs, said spring means being tensioned to normally retract the pegs, the side plates on movement in one direction having camming engagement with the spring means adapted to shift the same upwardly to extend the pegs against the restraint of the spring means, the respective side plates having shallow cam recesses and the spring means having depending projections seating in said recesses on movement of the side plates to a position permitting the spring means to retract the pegs, movement of the side plates in an opposite direction being adapted to shift the recesses out of registration with the projections for biasing the projections upwardly to extend the pegs, the spring means at each side of the game board comprising an elongated leaf spring fixedly secured intermediate its ends to the underside of the game board, the opposite end portions of the leaf spring being offset downwardly from the mid-length portion of the leaf spring, said projections being formed at the outer extremities of the respective end portions of the leaf spring.

References Cited in the file of this patent

UNITED STATES PATENTS

| | | |
|---|---|---|
| 597,755 | Wilson | Jan. 25, 1898 |
| 715,794 | Haskell | Dec. 16, 1902 |
| 1,167,407 | Johnson | Jan. 11, 1916 |
| 1,282,922 | Novotny | Oct. 29, 1918 |
| 1,635,735 | Zeigler | July 12, 1927 |
| 1,638,094 | Gilmour | Aug. 9, 1927 |
| 2,095,482 | Spicciato | Oct. 12, 1937 |
| 2,322,089 | Greitzer | June 15, 1943 |
| 2,500,830 | Jones | Mar. 14, 1950 |
| 2,630,756 | Crabtree | Mar. 10, 1953 |